United States Patent [19]

Grenier

[11] Patent Number: 4,773,161
[45] Date of Patent: Sep. 27, 1988

[54] PORTABLE LIQUID LEVEL

[76] Inventor: Rejean M. Grenier, 9360 Calliandra Dr., Boynton Beach, Fla. 33436

[21] Appl. No.: 52,406

[22] Filed: May 21, 1987

[51] Int. Cl.$^4$ .............................................. G01C 5/04
[52] U.S. Cl. .................................. 33/367; 73/290 R; 215/365
[58] Field of Search ............... 73/290 R; 33/367, 375; 222/530; 215/365

[56] References Cited

U.S. PATENT DOCUMENTS

| | | | |
|---|---|---|---|
| 2,197,958 | 4/1940 | Waters | 222/530 X |
| 2,574,931 | 11/1951 | Nason, Jr. | 222/530 X |
| 3,109,563 | 11/1963 | Morales | 222/530 X |
| 3,330,045 | 7/1967 | Selleck | 33/367 X |
| 3,651,581 | 3/1972 | Lehman | 33/367 |
| 4,297,791 | 11/1981 | Mende | 137/45 X |
| 4,536,968 | 8/1985 | Lopiccolo | 33/367 |
| 4,691,445 | 9/1987 | Fields, Jr. | 33/367 |

Primary Examiner—Daniel M. Yasich
Attorney, Agent, or Firm—John H. Faro

[57] ABSTRACT

A liquid level comprising a bottle for holding leveling liquid and means in its lower end for connecting to a length of hose. The bottle has a filler opening in its upper end and integral means for storing the hose around the bottle. The level may include a ventable bottle closure over the filler opening and a ventable hose closure detachably mounted on the extended end of the hose. The bottle may also include an integral clip on the outside surface of the bottle for receiving and holding an end portion of the hose. The bottle may have an integral handle on one side thereof and a mounting plate attached to the other side thereof.

16 Claims, 2 Drawing Sheets

PORTABLE LIQUID LEVEL

1. Field of the Invention

This invention relates to a novel liquid level, and particularly to a liquid level that is portable and can be used accurately by only one artisan.

2. Description of the Prior Art

Artisans, such as carpenters, pool builders, plumbers, tile setters and painters, have a need to locate and identify bench marks in a common horizontal plane, which marks may be up to 60 feet apart. Spirit or bubble levels are too short for such uses, while sight and laser levels are better used over longer distances. Liquid levels are low in cost and are conveniently used by artisans in their applications.

In its simplest form, a liquid level is a suitably long hose with a transparent portion or cylinder at each end. The ends are raised to the same height and the hose is filled with a liquid, such as water, to about the middle of the transparent portions. If the transparent portions are held against separated points, the top levels of the liquid will indicate points in the same horizontal plane, provided the levels are open to the atmosphere and the liquid is free to move about by gravity in the hose. This simple device requires two people to operate it. When not in use, the ends of the hose or cylinders may be plugged to prevent loss of liquid, and the hose can be coiled for storage and or transport.

For more accurate and rapid use in the field by one person, it has been found desirable to employ a reservoir of liquid at one end of the hose. Thereby, the surface level of the liquid is less variable and that surface level comes to equilibrium faster. The reservoir in the past has been a bowl or bucket- shaped container that is open to the atmosphere. The reservoir is set on a table or other raised surface, and the other end of the hose is used to locate points in a horizontal reference plane. Then, the artisan measures up or down from the reference plane to locate the desired bench marks in a horizontal plane. This modified device is bulky, cumbersome to use and is prone to lose leveling liquid, as by spillage, leakage and evaporation.

OBJECTS OF THE INVENTION

An object of this invention is to provide a novel liquid level.

Another object is to provide a novel liquid level that is easy and convenient to use by one person working alone.

Another object is to provide a novel liquid level that is not prone to lose leveling liquid.

Still another object is to provide a novel liquid level that can indicate bench marks directly without resort to points in a reference plane.

Another object is to provide a novel liquid level that can be setup and broken down quickly and easily.

Another object is to provide a novel liquid level that is truly portable, compact for storage and transport, and rugged for field use by artisans.

SUMMARY OF THE INVENTION

The novel liquid level comprises a bottle for holding leveling liquid and means in its lower end for connecting to a length of hose in a manner permitting free transfer of leveling liquid therebetween. The bottle has a filler opening in its upper portion and integral means for storing the hose around the bottle when the bottle is not in use. The storing means may be integral raised shoulders at both the upper and lower ends of the bottle. The level may include a ventable bottle closure over the filler opening and a ventable hose closure detachably mounted on the extended end of the hose. The bottle may also include an integral clip on the outside surface of the bottle for receiving and holding an end portion of the hose. The bottle may have an integral handle on one side thereof and a mounting plate attached to the opposite side thereof. The various features of the novel level permit the objects of the invention to be achieved.

DETAILED DESCRIPTION OF THE INVENTION INCLUDING THE PREFERRED EMBODIMENT

Figure 1:
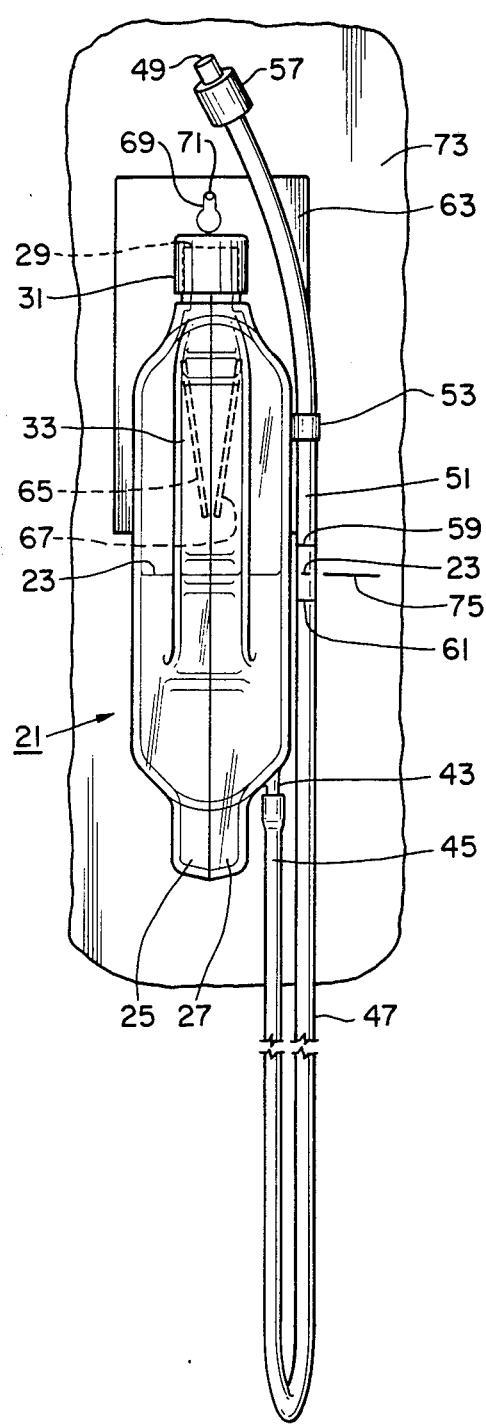
FIGS. 1 and 2 are, respectively, side and front views of a preferred embodiment of the novel device set up at an initial bench mark in a desired horizontal plane.

The following description of the preferred embodiment of the concept of this invention is made in reference to the accompanying figures. Where the individual elements in these figures are depicted in more than one figure, they are assigned a common reference numeral for simplification of identification and understanding.

Figure 2:
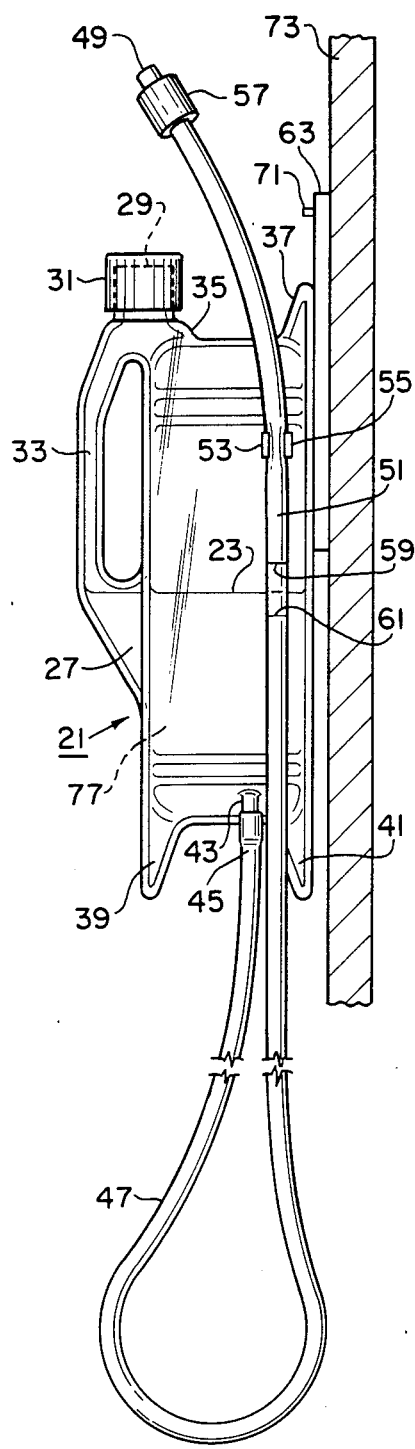

The preferred embodiment of the novel liquid level shown in FIGS. 1 and 2 includes a bottle 21, which may be of glass or plastic or other transparent material, such that the surface 23 of the liquid inside the bottle 21 can be seen from outside the bottle. This bottle 21 is made of a breakage-resistant plastic in two longitudinal parts 25 and 27, which are held together along the edges thereof with a permanent adhesive.

The bottle 21 has a neck, a filler opening 29 in the neck, and a ventable bottle closure, such as a cap 31 screwed thereon. The preferred cap 21 comprises two cap portions that are nested so that the outer portion can be popped down to close the vent or can be popped up to open the vent. The bottle 21 has a hollow handle 33 integral with and a part of one side of the bottle 21. The neck and filler opening 29 are located in the upper part of the handle 33.

The bottle 21 also has two integral upper raised shoulders 35 and 37 (FIG. 2.), the neck 29 and cap 31 being an extension of, and functioning as a part of, one shoulder 35. There are two integral lower raised shoulders 39 and 41 in the bottom portion of the bottle 21. The upper shoulders 35 and 37 extend upwardly. The lower shoulders 39 and 41 are substantially opposite the upper shoulders, and extend downwardly. The shoulders 35, 37, 39 and 41 together with the body of the bottle 21, constitute the bottle 21 as a spool on which a hose may be wound up and stored.

There is a connecting means in the form of a tubular nipple 43, for connecting a hose to the lower portion of the bottle 21 in such manner that liquid in the bottle 21 can flow freely by gravity therebetween. One end 45 of a hose 47 is pressed on the nipple 43. The hose 47 hangs down to a bend, or loop or coil, and then rises with the other extended end 49 above the bottle 21, with the extended end portion 51 along the side of the bottle 21.

The extended end portion 51 is held in this position by a clip in the form of two spaced upstanding fingers 53 and 55 which are integral with the side of the bottle 21. The fingers 53 and 55 are so spaced that the hose 47 can be pressed therebetween and the fingers hold the hose 47 but do not pinch off or close the opening therein.

The extended end portion 51 of the hose 47 between the fingers 53 and 55 and the end 49 carries a detachably mounted hose closure, such as a clamp 57 which can be closed manually to completely pinch off the tube 47 to prevent the loss of liquid, or can be opened manually to vent the liquid in the tube 47 to atmospheric pressure. The extended end portion 51 has two indicating marks 59 and 61 that are spaced about 3 centimeters apart. The extended end portion is transparent at least in the vicinity of the indicating marks 59 and 61 so that the surface level 23 of the liquid therein can be viewed.

A transparent plastic mounting plate 63 is attached to the outer surface of the bottle 21 on the opposite side from the handle 33. The bottle 21 may have wedge-shaped extensions 65 and 67 (FIG. 1), which fit into corresponding mating extensions, or alternatively slots, in the mounting plate 63. The mounting plate 63 is also attached to the bottle 21 with a permanent adhesive. The mounting plate 63 has a mounting aperture 69 near the upper edge thereof so that it can be hung on a nail 71 in a wall 73 of interest adjacent to where the initial bench mark 75 (FIG. 1) is made. The aperture 69 may be any shape, preferably keyhole-shaped.

In practice, the novel liquid level is arranged as shown in FIGS. 1 and 2 with the hose closure 57 open. The bottle closure 31 is removed and the bottle 21 and hose 47 are filled with liquid 77, such as water, or water with a harmless coloring matter. A preferred liquid is automotive anti-freeze windshield washer, which has colorant, is anti-freeze, anti-bacterial, and anti-mildew. The bottle 21 and hose 47 are filled so that the surface level 23 of liquid is between the indicating marks 59 and 61. The bottle closure 31 is replaced on the bottle 21 and closed. The hose closure 51 is also closed. In this condition, the liquid 75 in the bottle 21 is entirely contained and does not leak or evaporate.

When an artisan is ready to perform the leveling process, an initial bench mark 75 is placed on the wall 73. The bottle closure 31 and the hose closure 57 are both open. The novel device is held by the handle 33 with the mounting plate 63 against the wall 73, and the level 23 of the liquid in the extended end portion 51 between the indicating marks 59 and 61 opposite the initial mark 75. Because of the geometry of the novel device, this can be done accurately by visually sighting along the side of the bottle. With the mounting plate 63 properly in place, the plate 63 can be fixed in place with a nail 73 in the wall 73 through the aperture 69, or with one or more clamps if there is a frame work instead of a wall.

Figures 3, 4:
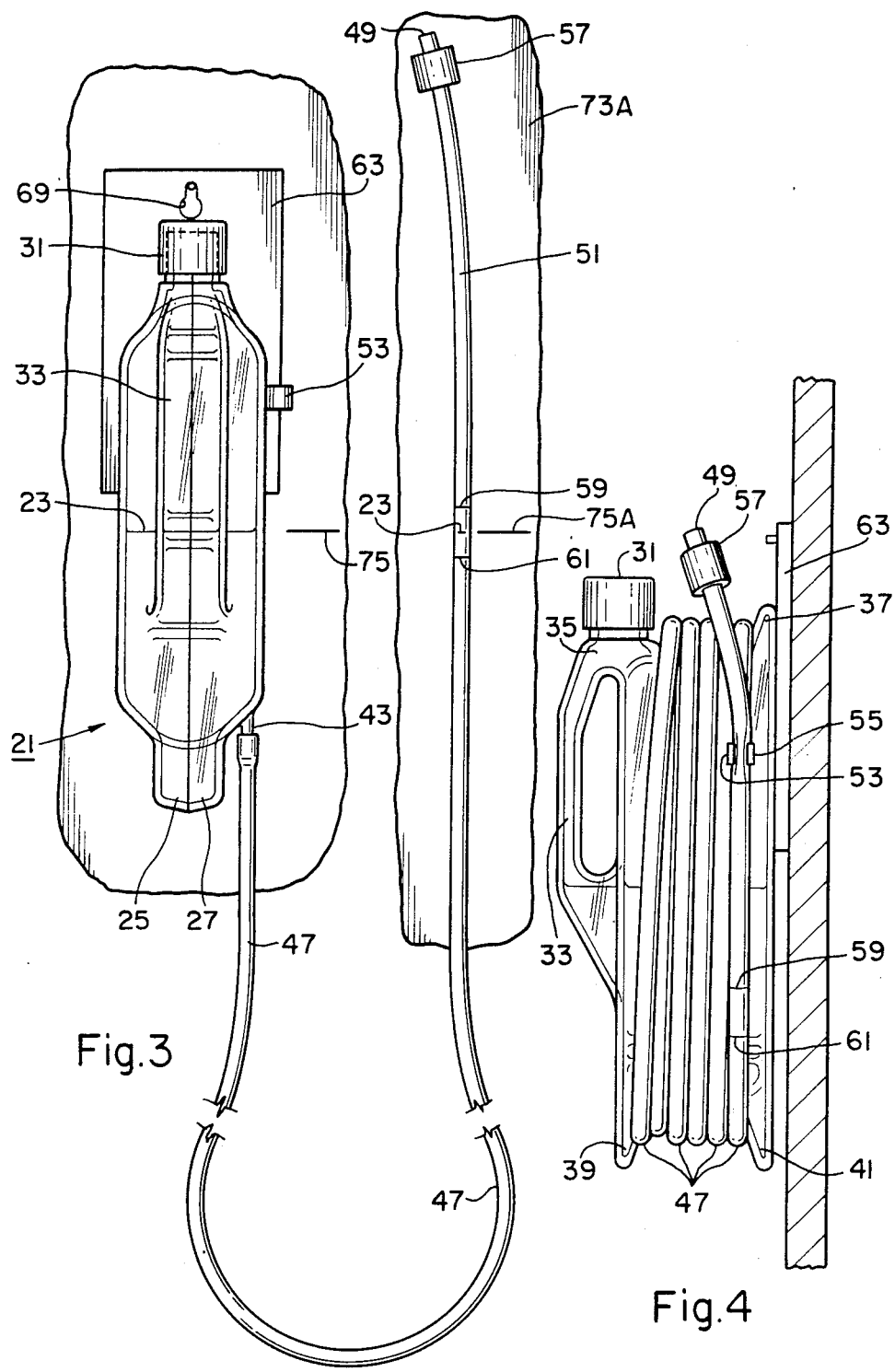
FIG. 3 is a side view of the device shown in FIGS. 1 and 2, but with the hose end positioned to locate one of a series of bench marks in the desired horizontal plane.
FIG. 4 is a front view of the device shown in FIGS. 1 and 3 with the hose thereof wound around the bottle of liquid, ready for storage and/or transport.

To identify other bench marks in the same horizontal plane as the bench mark 75 shown in FIG. 1 within the span of the hose 47, close the hose clamp 51 so that no liquid 77 will be lost then remove the extended end portion 51 from between the fingers 53 and 55. Referring now to FIG. 3, the extended end portion 51 is held against another portion of the wall 73, or against another wall, or any other structure such as a post or pole or article hanging from above, at about the same height as the initial bench mark 75. Now, the hose clamp 51 is opened so that the interior of the end portion 51 of the hose is at atmospheric pressure (the interior of the bottle is at the same atmospheric pressure since the cap 31 is in the open venting position). The extended end portion 51 is moved up or down so that the surface level 23 is between the indicating marks 59 and 61. When liquid movement stops in the hose 47, a bench mark 75A is applied on the wall 73A or other structure. The foregoing procedure is then repeated for each additional bench mark that is desired.

When marking is completed, the setup may be broken down by the following simple procedure with reference to FIGS. 3 and 4. The bottle closure 31 and the hose closure 57 are both closed. The bottle 21 is removed from the wall 73 or other structure. The hose 47 is wrapped around the bottle 21 between the upper shoulders 35 and 37 and between the lower shoulders 39 and 41, and the extended end portion 51 is pressed between the fingers 53 and 55 as shown in FIG. 4 to make a neat, compact, leakresistant package. Nothing else is altered. Thus, when the novel device is needed again for leveling, the hose 47 is simply unwound from the bottle 21, and the setup described in conjunction with FIGS. 1 and 2 will be ready for use, except for mounting the device on a wall or other structure.

If liquid is lost from the device, the readings for bench marks may be affected, so the surface level of liquid in the the bottle should be reset to a proper height before proceeding. If air bubbles develop in the hose, they may be removed by unwinding the hose from the bottle, holding or mounting the bottle upright, opening the bottle closure and the hose closure, raising the hose above the bottle to empty the liquid in the hose into the bottle, then lowering the hose to refill it with liquid. The bottle and hose closures may then be closed.

There are many alternative arrangements from the above description which are within the scope of the invention. For example, a hose 47 of one length mounted on the nipple 43 can be replaced with a hose of a different length by closing the bottle closure, inverting the bottle, slipping the hose off the nipple and clamping it with liquid therein and slipping the replacement hose on the nipple. As another example, the bottle may be fabricated by other processes such as by blow-molding or roto-casting the bottle and mounting plate in one piece without resort to adhesives.

The foregoing figures and the descriptions thereof are illustrative of some of the concepts of the invention. While the preferred embodiment represents what is regarded as the best mode for practicing the invention, it is not intended as delineating the scope of the concepts which are set forth in the following claims.

What is claimed is:

1. A liquid level of the type comprising a reservoir for leveling liquid and a length of hose attached to said reservoir permitting free transfer of liquid therebetween, said reservoir comprising a bottle for holding said leveling liquid, said bottle having an integral handle, a filler opening at its upper end, means near its lower end for connecting one end of said hose thereto, and integral means for storing said length of hose around said bottle when said level is not in use, said storing means including two spaced-apart upper shoulders integral with and extending upwardly from the upper portion of said bottle, and two spaced-apart lower shoulders integral with and extending downwardly from the lower portion of said bottle, said lower shoulders being substantially opposite said upper shoulders.

2. The liquid level defined in claim 1 wherein said bottle has an integral clip on the outside surface thereof for receiving and holding an end portion of said hose.

3. The liquid level defined in claim 1 including a ventable bottle closure over said filler opening.

4. The liquid level defined in claim 3 wherein said bottle closure comprises two nested cap portions adapted to be manually positioned between a closed, non-venting position and an open, venting position.

5. The liquid level defined in claim 1 wherein said handle is integral with one of said upper shoulders.

6. The liquid level defined in claim 1 wherein said filler opening is located in the upper part of said handle.

7. The liquid level defined in claim 1 including a mounting plate attached to the outer surface of said bottle on the opposite side thereof from said handle.

8. The liquid level defined in claim 7 wherein said mounting plate is attached to said bottle with means including adhesive material.

9. The liquid level defined in claim 8 wherein said mounting plate is attached to the outer surface of said bottle with means including a wedged structure and adhesive material.

10. The liquid level defined in claim 1 wherein said hose-connecting means is a tubular nipple extending out from said bottle, and said level includes an extended length of hose attached at one end thereof to said nipple.

11. The liquid level defined in claim 10 wherein at least the terminal portion of the other end of said hose is transparent, and said transparent terminal portion has at least two spaced indicating marks thereon.

12. The liquid level defined in claim 11 including a ventable hose closure on said hose between said indicating marks and the terminal end of said hose.

13. A liquid level comprising a bottle for holding leveling liquid therein and a length of hose operably connected at one end thereof to the lower portion of said bottle, said bottle having an integral handle, integral means for storing said length of hose around said bottle and means for preventing the loss of liquid when said level is not in use, said storing means including two spaced-apart upper shoulders integral with and extending upwardly from the upper portion of said bottle, and two spaced-apart lower shoulders integral with and extending downwardly from the lower portion of said bottle, said lower shoulders being substantially opposite said upper shoulders.

14. The liquid level defined in claim 13 including an integral clip in the form of two upstanding fingers on the outer surface of said bottle, said fingers being spaced-apart to hold said hose therebetween near the extended other end thereof.

15. The liquid level defined in claim 13 wherein said bottle includes a filler opening in the upper portion thereof, and a ventable closure over said opening.

16. The liquid level defined in claim 13 including a handle integral with said bottle, one of said shoulders comprising a portion of said handle, and said filler opening being located in the upper portion of said handle.

* * * * *